US007393603B1

(12) United States Patent
Schumer et al.

(10) Patent No.: US 7,393,603 B1
(45) Date of Patent: Jul. 1, 2008

(54) METHODS FOR FUEL CELL SYSTEM OPTIMIZATION

(75) Inventors: Steven Edward Schumer, San Jose, CA (US); Arne Watson Ballantine, Menlo Park, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 11/641,942

(22) Filed: Dec. 20, 2006

(51) Int. Cl.
*H01M 8/04* (2006.01)
*H01M 8/24* (2006.01)

(52) U.S. Cl. .............................. 429/13; 429/18; 429/22
(58) Field of Classification Search ................ 123/1 A; 429/12, 13, 18, 22–25; 903/944
See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van Dine | |
| 4,532,192 A | 7/1985 | Baker et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,527,631 A | 6/1996 | Singh et al. | |
| 5,573,867 A | 11/1996 | Zafred et al. | |
| 5,601,937 A | 2/1997 | Isenberg | |
| 5,629,103 A * | 5/1997 | Wersing et al. | ............... 429/33 |
| 5,686,196 A | 11/1997 | Singh et al. | |
| 5,733,675 A | 3/1998 | Dederer et al. | |
| 5,741,605 A | 4/1998 | Gillett et al. | |
| 5,955,039 A | 9/1999 | Dowdy | |
| 6,013,385 A | 1/2000 | DuBose | |
| 6,033,794 A | 3/2000 | George et al. | |
| 6,051,125 A | 4/2000 | Pham et al. | |
| 6,280,865 B1 | 8/2001 | Eisman et al. | |
| 6,329,090 B1 | 12/2001 | McElroy et al. | |
| 6,403,245 B1 | 6/2002 | Hunt | |
| 6,436,562 B1 | 8/2002 | DuBose | |
| 6,451,466 B1 | 9/2002 | Grasso et al. | |
| 6,531,243 B2 | 3/2003 | Thom | |
| 6,569,298 B2 | 5/2003 | Merida-Donis | |
| 6,569,549 B1 | 5/2003 | Sawyer | |
| 6,623,880 B1 | 9/2003 | Geisbrecht et al. | |
| 6,821,663 B2 | 11/2004 | McElroy et al. | |
| 6,887,608 B2 | 5/2005 | Yamada | |
| 7,014,932 B2 | 3/2006 | Halter et al. | |
| 7,129,674 B2 * | 10/2006 | Ichinose et al. | ............. 320/101 |
| 7,201,979 B2 | 4/2007 | McElroy et al. | |
| 2001/0049035 A1 | 12/2001 | Haltiner, Jr. et al. | |
| 2002/0028362 A1 | 3/2002 | Prediger et al. | |
| 2002/0051898 A1 | 5/2002 | Moulthrop, Jr. et al. | |
| 2002/0058175 A1 | 5/2002 | Ruhl | |
| 2002/0106544 A1 | 8/2002 | Noetzel et al. | |
| 2002/0142208 A1 | 10/2002 | Keefer et al. | |
| 2003/0157386 A1 | 8/2003 | Gottmann et al. | |
| 2003/0162067 A1 | 8/2003 | McElroy | |
| 2003/0167105 A1 | 9/2003 | Colborn | |
| 2003/0196893 A1 | 10/2003 | McElroy et al. | |
| 2003/0205641 A1 | 11/2003 | McElroy et al. | |
| 2004/0013923 A1 | 1/2004 | Molter et al. | |
| 2004/0081859 A1 | 4/2004 | McElroy et al. | |
| 2004/0115489 A1 | 6/2004 | Goel | |
| 2004/0137300 A1 | 7/2004 | Gemmen et al. | |
| 2004/0146761 A1 * | 7/2004 | Cargnelli et al. | ............... 429/22 |
| 2004/0191595 A1 | 9/2004 | McElroy et al. | |
| 2004/0191597 A1 | 9/2004 | McElroy | |
| 2004/0191598 A1 | 9/2004 | Gottmann et al. | |
| 2004/0202914 A1 | 10/2004 | Sridhar et al. | |
| 2004/0219398 A1 * | 11/2004 | Calhoon | ....................... 429/13 |
| 2004/0224193 A1 | 11/2004 | Mitlitsky et al. | |

(Continued)

FOREIGN PATENT DOCUMENTS

JP      2002-63924      2/2002

(Continued)

OTHER PUBLICATIONS

Cell and Stack Construction: Low-Temperature Cells, L. G. Austin, NASA SP-120, 1967.

(Continued)

*Primary Examiner*—Willis R Wolfe, Jr.
(74) *Attorney, Agent, or Firm*—Foley & Lardner LLP

(57) ABSTRACT

A method of operating a fuel cell system which includes operating a fuel cell system at one or more operational modes, wherein said fuel cell system is configured to operate at a plurality of operational modes comprising: maximum power output, maximum system efficiency, maximum reliability, maximum lifetime, maximum return on investment or a mode combining any two or more of the preceding.

24 Claims, No Drawings

U.S. PATENT DOCUMENTS

| | | | |
|---|---|---|---|
| 2005/0031922 A1* | 2/2005 | Clingerman et al. | 429/22 |
| 2005/0048334 A1 | 3/2005 | Sridhar | |
| 2005/0242588 A1* | 11/2005 | Washington | 290/1 A |
| 2006/0102397 A1* | 5/2006 | Buck et al. | 180/65.3 |
| 2006/0177711 A1* | 8/2006 | Calhoon | 429/13 |
| 2007/0141416 A1* | 6/2007 | Killian et al. | 429/23 |
| 2007/0199746 A1* | 8/2007 | Reid et al. | 180/65.3 |
| 2008/0070073 A1* | 3/2008 | Petersen et al. | 429/22 |

FOREIGN PATENT DOCUMENTS

| | | |
|---|---|---|
| KR | 10-2006-0093539 | 8/2006 |
| WO | WO 2004/093214 | 10/2004 |

OTHER PUBLICATIONS

Low Cost, High Efficiency Reversible Fuel Cell Systems, Proceedings of the 2002 U.S. DOE Hydrogen Program Review, NREL/CP-610-32405.

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535.

Regenerative Fuel Cells for High Altitude Long Endurance Solar Powered Aircraft, F. Mitlitsky, et al, 28$^{th}$ Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, Sep. 1994 Fuel Cell Seminar, Sep. 6, 1994, UCRL-JC-117130.

"High Temperature Electrolysis of Steam and Carbon Dioxide", Soren Hojgaard Jensen et al., from Proceedings of Riso International Energy Conference, held at Riso National Laboratory, Denmark, May 19-21, 2003, Riso-R-1405(CN), pp. 204-215, L.S. Peterson and H. Jensen, eds.

* cited by examiner

METHODS FOR FUEL CELL SYSTEM OPTIMIZATION

BACKGROUND OF THE INVENTION

The present invention is directed to fuel cell systems and operation thereof.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY OF THE INVENTION

Embodiments of the present invention describe methods of operating a fuel cell system comprising: operating a fuel cell system at one or more operational modes, wherein said fuel cell system is configured to operate at a plurality of operational modes comprising: maximum power output, maximum system efficiency, maximum reliability, maximum lifetime, maximum return on investment or a mode combining any two or more of the preceding. In a specific embodiment, a fuel cell system comprises: a computer system for directing the operation of said fuel cell system, said computer system comprising: a processor; and a memory, coupled to the processor, the memory comprising a plurality of instructions executed by the processor, the plurality of instructions configured to: operate the fuel cell system in a first operational mode; and switch the fuel cell system to a second operational mode; wherein said first and second operational modes are each selected from an array of operational modes comprising: maximum power output, maximum system efficiency, maximum reliability, maximum lifetime, maximum return on investment or a mode combining any two or more of the preceding.

DETAILED DESCRIPTION OF THE PREFERRED EMBODIMENTS

Currently available fuel cell systems are typically optimized for performance based on one or possibly two parameters. The most typical parameters being maximum output power and customer load. Several problems accompany such performance optimizations.

First, when fuel costs are high, operation at a maximum power setting (or operating to meet all customer load demands) may be a poor choice economically, thereby reducing the economic benefits expected of the system.

Second, given the typical shape of the efficiency curve of a fuel cell system, operating at a maximum power setting when the need for reduced $CO_2$ emissions is in effect, is an inappropriate choice, particularly when in violation of the conditions under which the system has been licensed for operation.

Finally, if it is desired to maintain the longest possible economic lifetime or reliability of the equipment (of the fuel cell system), then operating at a maximum output power or following a load profile will not be satisfactory.

The embodiments of the present invention overcome the aforementioned problems by providing a flexible approach to operating a fuel cell system. Namely they provide the ability operate at one or more different operational modes. For instance, all settings are adjusted to optimize to an operational mode of the fuel cell system such as maximum return on investment.

Whereas previous fuel cell generator systems operate strictly to generate power at a specified output level or to generate power following a varying load profile, embodiments of the present invention enable optimization of system output to a number of key variables. For example, this system allows the optimization of the system output to maximum return on investment. This ensures that the fuel cell generator equipment purchased is best utilized for return on investment.

Accordingly, in one aspect of the present invention a fuel cell system is configured to operate at one or more different operational modes.

In another aspect, a fuel cell system is configured to switch between at least two different operational modes.

In another aspect, a fuel cell system is operated at a mode selected from an available list of modes.

In another aspect, a fuel cell system is operated at a mode based on data provided to the system.

In yet aspect, a fuel cell system is configured to automatically switch from one operational mode to another different mode based on data provided thereto.

In yet another aspect, a fuel cell system is configured with a control system for automatically selecting between operational modes.

In still another aspect, a fuel cell system is configured with a computer system for automatically selecting between operational modes.

Embodiments of the present invention describe a fuel cell system control method whereby it is possible to select from multiple criteria for system operation. The controller of the fuel cell system will optimize system operation against these criteria, to achieve the following operational modes: maximum power output, maximum system efficiency, maximum reliability, maximum lifetime, maximum return on investment or a mode combining any two or more of the preceding.

Maximum output power generally describes a state of the fuel cell system wherein the system outputs the maximum possible output power without damage. For instance, system controls are adjusted to make changes, such as increasing the fuel cell temperature and/or increasing the fuel flow rate to the upper end of their allowed range.

In the maximum efficiency mode, the fuel system operates at the maximum possible overall efficiency. For example, the control system constantly monitors stack voltages, inverter power losses and auxiliary component loads and selects both thermal and electric conversion levels to be at the level where system efficiency is optimized. This output power will almost always be less than the maximum output power of the system and it will also be less than the minimum output power of the system because of the shape of the curve of fuel cell efficiency, electric power conversion efficiency curve, and auxiliary component power losses. Typically, fuel cell efficiency decreases with increased power, at the higher limits. Fixed power auxiliary devices have a decreasing negative impact on efficiency the higher the output power of the system is. Losses such as pump, blower, and resistive heating losses will increase continuously as the output power of the system is increased.

In the maximum reliability this mode, the fuel cell system is operated in a mode where age-related and thermal effects are minimized while maintaining and acceptable load for the customer. In this mode, the controller will isolate outputs which, for example, are paralleled to increase load-sharing of 25 KW modules. Thus, an efficiency loss may be incurred. However, by isolating outputs, the reliability of each individual output is increased.

Similar to maximum reliability mode, the maximum lifetime mode optimizes control parameters, such as stack temperature, reformer temperature, power level, humidity, and gas fuel flow in order to achieve the longest lifetime of components, such as the fuel cell stacks, hot box metal components, and auxiliary components such as the inverter or air blowers. In this mode, the temperature parameter in particular would be minimized to the lowest possible value for sustained operation in order to minimize the degradation rate of fuel cell components.

In maximum return on investment mode, the fuel cell system adjusts its output in order to obtain a maximum return on system investment. One or more of several key inputs based on the customer installation are maintained through system lifetime: cost of fuel; opportunity and lost-business costs; grid stability or fraction of capacity; cost or credit of $CO_2$ (or other) system emissions; cost of system hardware; and cost of replacement electricity from the grid (as a function of yearly season and time of day). The system is then configured with upper and lower limits on key system parameters such as output power and stack temperatures. The system is also configured with limits on key external factors such as grid power cost, grid stability, and loss of power risk. The control system optimizes system parameters to minimize the cost of power generation throughout the projected lifetime of the system.

In one embodiment, a combined mode is used wherein two or more of said operational modes coincide via the same system settings. For example, maximum efficiency and maximum lifetime are both optimized with the same settings. This might involve operating at a temperature which maximizes lifetime, but at a power level which maximizes efficiency.

In another embodiment, a method of operating a fuel cell system involves the steps of operating the fuel cell system at a first operational mode and switching from said first operational mode to a second operational mode. Said first and second operational modes are different from one another and each independently selected from a list of modes comprising maximum power output, maximum system efficiency, maximum reliability, maximum lifetime, maximum return on investment or a mode combining any two or more of the preceding.

As previously noted, a benefit of the present invention is a flexible approach to operating a fuel cell system. In sequential or multiple mode operation methods, the fuel cell system is flexibly operated based on the desired benefits to the end user and/or supplier of power. This method will permit automatic, permissive switching among the modes discussed above. If, for example, the fuel cell system is operating in the maximum output power mode, the control system can be so configured as to automatically respond to such events as, but not limited to, time-of-day electric rate changes by changing to maximum return on investment mode. These events, provided as data to said fuel cell system, or controller for the system, may further include other externally supplied market signals such as price of spot-market such as natural gas, for systems which operate on natural gas.

In some cases, user definable control modes might be included. In these modes, the matrix of parameters limits, the matrix of costs, and the matrix of system responses could be manipulated by the customer in order to obtain an optimization which the customer's circumstances dictate.

The user settings could be triggered to change on a time of day basis for use in peak-shaving. This might be particularly appropriate in installations where billing rates change at discrete times and cost of power is unacceptably high.

The control system could be configured to recognize and diagnose situations where a change in system configuration may lead to, for example, an improved return on investment condition. For instance, if three 25 KW hot box modules were installed, but base load exceeds 100 KW and $CO_2$ emissions costs are great, the control system could flag for the user the advantage of installing a fourth 25 KW hot box module.

Operation of the fuel cell system may be carried out manually or automatically. Both types of operation are further described below. For instance, a particular group of settings may be associated with one of the operational modes wherein activation of said settings can be carried out in one step. Preferably, the settings are constantly monitored and adjusted to achieve the optimal state of the system, be it maximum power output, maximum system efficiency, maximum reliability, maximum lifetime, maximum return on investment or a mode combining any two or more of the preceding.

In manual operation, a human operator may change the operational mode of the fuel cell system by using a control system such as a computer or a control panel, based on the desired benefits as previously discussed. As in some embodiments, displayed or printed data pertaining to events such as fuel cost, or electricity cost may be used by the human operator in selecting the most appropriate mode.

In automatic operation, the control system such as a computer or a dedicated logic chip (or circuit) is configured to store operational mode parameters and execute an operational mode from of list of: maximum power output, maximum system efficiency, maximum reliability, maximum lifetime, maximum return on investment or a mode combining any two or more of the preceding. Data pertaining to events previously described would be received by the control system and positively (switch to new mode) or negatively (stay at the same mode) acted upon.

Therefore, another method involves operating a fuel cell system equipped with a control system by activating said control system to switch the operational mode of the fuel cell from a first mode to a second mode.

In embodiments of the present invention wherein operational modes are switched between two or more different ones, any combination can result. That is, the first, second, third, etc. modes are each independently chosen from the list of operational modes previously described. This obviously can result in a very large number of combinations or permutations.

In another embodiment, a fuel cell system includes a fuel cell stack and a computer system for directing the operation of said fuel cell system. Said computer system preferably comprises a processor, and a memory coupled to the processor. The memory stores a plurality of instructions (corresponding to operational modes) executed by the processor, to operate the fuel cell system in a first operational mode. If need be, the computer system can switch the fuel cell system to a second operational mode. Of course the number of times the switching occurs is potentially limitless. Said first and second operational modes are each selected from maximum power output, maximum system efficiency, maximum reliability, maximum lifetime, maximum return on investment or a mode combining any two or more of the preceding.

The computer system may be equipped to receive data pertaining to, but not limited by, time-of-day electric rate changes or fuel cost. Upon receipt of the data, the computer system may select to switch or not switch modes based on how it is programmed. The data may be provided from the internet, entered manually by the operator provided from other data sources.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system comprising:
   a computer system for directing the operation of said fuel cell system, said computer system comprising:
   a fuel cell stack;
   a processor; and
   a memory, coupled to the processor, the memory comprising a plurality of instructions executable by the processor, the plurality of instructions configured to:
   operate the fuel cell system in a first operational mode; and
   switch the fuel cell system to a second operational mode;
   wherein said first and second operational modes are each selected from an array of operational modes comprising: maximum power output, maximum system efficiency, maximum reliability, maximum lifetime, maximum return on investment or a mode combining any two or more of the preceding.

2. A fuel cell system comprising:
   a fuel cell stack; and
   a means for:
   operating the fuel cell system at a first operational mode; and
   switching from said first operational mode to a second operational mode,
   wherein said first and second operational modes are different from one another and each independently selected from a list of modes comprising: maximum power output, maximum system efficiency, maximum reliability, maximum lifetime, maximum return on investment or a mode combining any two or more of the preceding.

3. A method of operating a fuel cell system comprising:
   providing a fuel cell system comprising a fuel cell stack and a control system;
   storing in the control system a list of operational mode parameters which correspond to a maximum power output mode, a maximum system efficiency mode, a maximum reliability mode, a maximum lifetime mode, a maximum return on investment mode and a mode combining any two or more of the preceding; and
   executing a first operational mode from the list of operational mode parameters stored in the control system to operate the fuel cell system in the first operational mode.

4. The method of claim 3, further comprising executing a second operational mode different from the first operational mode from the list of operational mode parameters stored in the control system to operate the fuel cell system in the second operational mode.

5. A method of operating a fuel cell system comprising:
   operating the fuel cell system at a first operational mode; and
   switching from said first operational mode to a second operational mode,
   wherein said first and second operational modes are different from one another and each independently selected from a list of modes comprising: maximum power output, maximum system efficiency, maximum reliability, maximum lifetime, maximum return on investment or a mode combining any two or more of the preceding.

6. The method of claim 5 wherein switching between the first and second operational modes is carried out manually.

7. The method of claim 5 wherein the first mode is maximum power output.

8. The method of claim 5 wherein the second mode is maximum power output.

9. The method of claim 5 wherein the first mode is maximum system efficiency.

10. The method of claim 5 wherein the second mode is maximum system efficiency.

11. The method of claim 5 wherein the first mode is maximum reliability.

12. The method of claim 5 wherein the second mode is maximum reliability.

13. The method of claim 5 wherein the first mode is maximum lifetime.

14. The method of claim 5 wherein the second mode is maximum lifetime.

15. The method of claim 5 wherein the first mode is maximum return on investment.

16. The method of claim 5 wherein the second mode is maximum return on investment.

17. The method of claim 5 wherein the first mode is a mode combining two or more of maximum power output, maximum system efficiency, maximum reliability, maximum lifetime, maximum return on investment.

18. The method of claim 5 wherein the second mode is a mode combining two or more of maximum power output, maximum system efficiency, maximum reliability, maximum lifetime, maximum return on investment.

19. The method of claim 5 wherein the system further comprises a control system for storage and execution of settings for each operational mode.

20. The method of claim 19 further comprising the step of activating the control system to switch the operational mode of the fuel cell from the first mode to the second mode.

21. The method of claim 5 wherein switching between the first and second operational modes is carried out automatically.

22. The method of claim 21 wherein the switching is carried out based on data provided to the system.

23. The method of claim 22 further comprising the step of providing data to the system.

24. The method of claim 22 wherein the data comprises: time-of-day electric rate changes, fuel cost or $CO_2$ emission levels.

* * * * *